United States Patent [19]
Varghese et al.

[11] Patent Number: 5,905,723
[45] Date of Patent: *May 18, 1999

[54] SYSTEM FOR ACHIEVING SCALABLE ROUTER PERFORMANCE

[75] Inventors: George Varghese, Bradford; David R. Oran, Acton; Robert Eugene Thomas, Hudson, all of Mass.

[73] Assignee: Cabletron Systems, Inc., Rochester, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 08/499,872

[22] Filed: Jul. 10, 1995

Related U.S. Application Data

[63] Continuation of application No. 08/081,623, Jun. 23, 1993, abandoned.

[51] Int. Cl.$^6$ .............................. H04Q 11/04; H04J 3/24
[52] U.S. Cl. ..................... 370/351; 370/352; 340/826
[58] Field of Search .................. 340/825.02, 826, 340/827; 370/60, 60.1, 94.1, 94.3, 61, 85.13, 85.14, 351, 352, 401–405; 395/725

[56] References Cited

U.S. PATENT DOCUMENTS

| | | | |
|---|---|---|---|
| 4,737,953 | 4/1988 | Koch et al. | 370/85.13 |
| 5,020,052 | 5/1991 | DePrycker at al. | 370/61 |
| 5,088,091 | 2/1992 | Schroeder et al. | 340/825.02 |
| 5,136,580 | 8/1992 | Videlock | 370/94.1 |
| 5,138,615 | 8/1992 | Lamport et al. | 370/94.1 |
| 5,140,585 | 8/1992 | Tomikawa | 370/94.3 |
| 5,172,372 | 12/1992 | Konishi | 370/94.3 |
| 5,177,736 | 1/1993 | Tanabe et al. | 370/94.1 |
| 5,179,558 | 1/1993 | Thacker et al. | 340/825.02 |
| 5,239,537 | 8/1993 | Sakauchi | 340/827 |
| 5,265,257 | 11/1993 | Simcoe et al. | 395/725 |
| 5,490,252 | 2/1996 | Macera et al. | 395/200.01 |
| 5,509,123 | 4/1996 | Dobbins et al. | 395/200.15 |

OTHER PUBLICATIONS

*Webster's New World Dictionary of Computer Terms*, 4th Edition, Compiled by Donald Spencer, Prentice Hall, New York, 1992.
*Data and Computer Communications*, 2nd Edition, Macmillan Publishing, New York, 1988.
"Integrated Routing (and Bridging . . . )," William M. Seifert, Vice President, Chief Technical Officer, Wellfleet Communications, Inc., Bedford, Massachusetts 01730.
*Communication Networks for Computers*, Donald W. Davies and Derek L.A. Barber, John Wiley & Sons, London, 1973.
"The Intersect Local Bridge from Persoft," LAN Times, McGraw–Hill, Inc., 1991.
"Connection for Multi–Networking—Hardware or Software?," Network Monitor, Predicasts, 1991.

*Primary Examiner*—Edwin C. Holloway, III
*Attorney, Agent, or Firm*—Wolf, Greenfield & Sacks, P.C.

[57] ABSTRACT

A network interconnection device having a router connected by a plurality of links to at least one multiport switch is presented. Each of the plurality of links is connected between one port of the router and one port of the multiport switch such that each link represents a separate path between the router and the multiport switch over which data packets may be transferred. Sets of links are defined as hunt groups, which contain multiple instances of a given resource. Each port has a forwarding engine. When a packet arrives at a router port, the forwarding engine checks if the packet destination port belongs to the same hunt group as the packet sending port. If the destination port and the packet sending port belong to the same group, the packet is sent back through the same port through which it arrived without having to pass through the router backplane, thus transferring the packet efficiently.

4 Claims, 2 Drawing Sheets

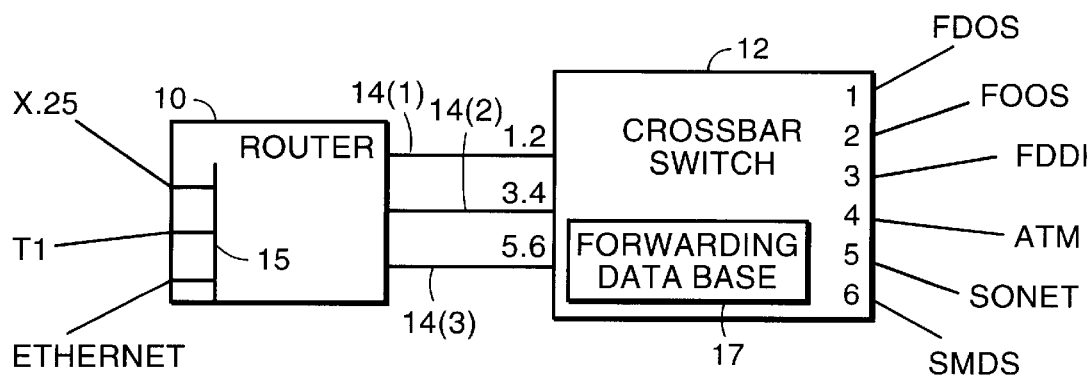
FIG. 1
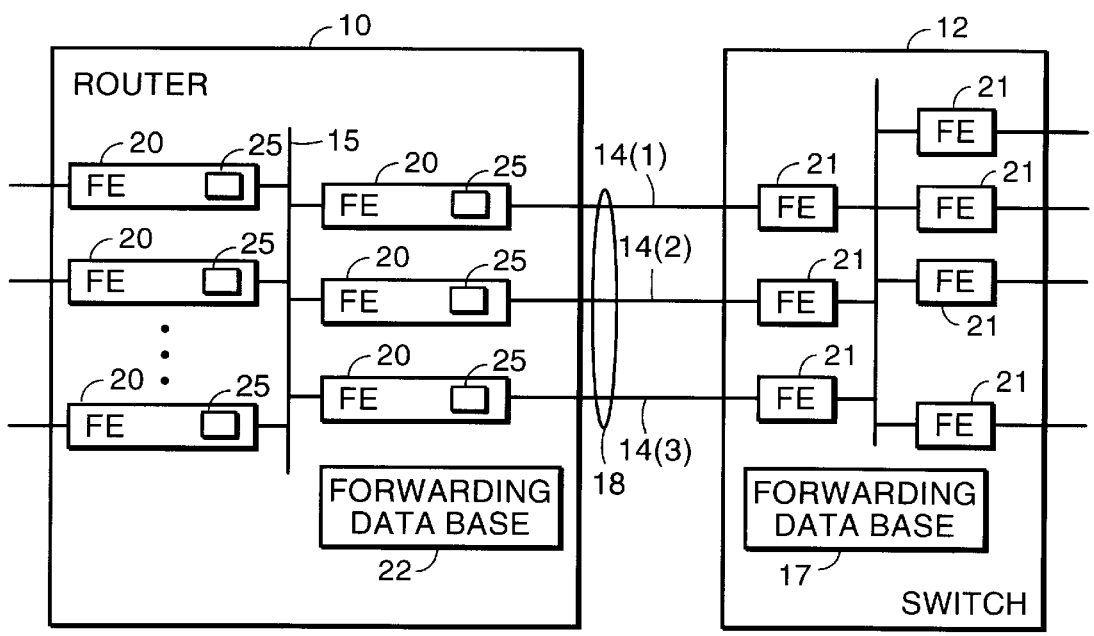
FIG. 2
```
IF (DESTINATION_GROUP = SOURCELINK_GROUP)
    SEND PACKET BACK ON LINK OVER WHICH IT WAS RECEIVED
ELSE
    SEND PACKET TO BACKPLANE FOR TRANSFER TO
    DESTINATION PORT
```
FIG. 3

SYSTEM FOR ACHIEVING SCALABLE ROUTER PERFORMANCE

This application is a continuation of application Ser. No. 08/081,623, filed Jun. 23, 1993, now abandoned.

BACKGROUND OF THE INVENTION

The invention relates to routers that are used on computer networks.

A router is a device that is used to interconnect Local Area Networks (LANs) and stations to form large networks. As networks grow in speed to 100 Mbit/sec and higher, the performance of routers has become an important issue. Because the performance of routers is often limited by the fixed overhead of processing the header of a packet, the performance of a router is often measured in packets/second. Currently, there are a few high-end routers with a performance of 60–80,000 packets/second. Depending on the average size of the packets being forwarded, this translates into a forwarding rate of between 16 Mbit/sec (using 32 byte packets) and 100 mbit/sec (using 256 byte packets).

Currently, the next milestone that most high-end router vendors are aiming for is to exhibit a router that can forward 100,000 packets/second. But one major reason why the forwarding performance of many high speed routers cannot reach 100,000 packets per second is that performance is limited by the speed of the router's internal backplane bus. Their performance, however, though limited by the speed of the backplane, is quite adequate for connecting low speed (10 Mbit/sec or less) lines.

Recently crossbar switches have appeared in the marketplace (e.g. the GIGAswitch from Digital Equipment Corporation) that are able to transfer packets at a rate of ½ million packets per second. The GIGAswitch, for example, has 22 ports that can connect 22 lines of 100 Mbit/sec or greater. These include FDDI LANs as well as ATM, SONET, and SMDS lines. The GIGAswitch also has a feature called "hunt groups" by which several ports can be grouped together to form a logical port (for further details see U.S. patent application, Ser. No. 07/542,856 now issued as Pat. No. 5,265,257, on Nov. 23, 1993, entitled Fast Arbiter Having Easy Scaling for Large Numbers of Requesters, Large Numbers of Resource Types with Multiple Instances of Each Type, and Selectable Queuing Disciplines, incorporated herein by reference). Packets sent to a logical port are sent by the switch to any of the physical ports that constitute the hunt group. Thus, any packets sent from the high speed lines to the hunt group are distributed among the physical ports according to a load balancing algorithm inside the switch. The result is increased bandwidth communication to the hunt group.

Such switches, however, do not have ability to be a router.

SUMMARY OF THE INVENTION

In general, in one aspect, the invention features a network interconnection device including a router, a plurality of links, and a multiport switch. The router has a first plurality of ports and for each port a forwarding engine that receives and forwards packets received through its port. The multiport switch has a second plurality of ports, wherein a subset of those ports defines a group. Each port of the group is connected by a different one of the links to a different port of the first plurality of ports; thus, each link represents a different path between the router and the switch over which packets may be transferred. The router also includes mapping logic for mapping the ports of the switch to the links such that different switch ports are assigned to different links. The forwarding engine for any given router port of the group upon receiving a received packet identifies a receiving port and a destination port for the received packet, the receiving port identifying the port through which that received packet was received by that forwarding engine and the destination port identifying a port to which the mapping logic maps the received packet for forwarding to a destination. The forwarding engine also includes logic for determining whether the destination port and the receiving port belong to the group, and logic for causing that forwarding engine to transmit the received packet back through the receiving port if the receiving port and the destination port are members of the same group.

Preferred embodiments include the following features. In the network interconnection device the assignment of different switch ports to different links can be either a static or a dynamic assignment. The switch also includes an assignment means assigning different ports of the switch to different links of the plurality of links. Upon receiving an incoming packet through a port that is assigned to one of the links by the assignment means, the switch forwards that incoming packet to the link to which that port is assigned by the assignment means. The assignment means makes either a static or a dynamic assignment of ports to links.

Also in preferred embodiments, the network interconnection device also includes a backplane bus over which packets are transferred from one router port to another router port. The forwarding engine for any given port forwards the received packet to another router port over the backplane bus if either the receiving port and the destination port are not members of a same group. The determining means includes a table that identifies all ports which are members of the group and it uses that table to determine whether the receiving port and the destination port are members of the same group.

The invention replaces the backplane bus for the router with the switch and uses the hunt group capability of the switch to provide scalable routing performance. By connecting the router to a crossbar switch through one or more links, it becomes possible to scale the performance of existing routers to 100,000 packets/sec and higher. The invention allows the performance of the router to increase by increasing the number of links connecting the router and the switch. The scheme is inherently scalable, i.e., the router performance can be increased linearly by increasing the number of connections between the router and the crossbar switch.

A router normally connects together various LANs (e.g., Ethernets) and point-to-point links (e.g., T1 lines). According to one aspect of the invention, the high-performance LANs and point-to-point links are connected directly to the crossbar switch (instead of directly connecting them to the router).

The invention applies especially to routers that have a separate forwarding engine per line and whose forwarding performance is limited by the speed of the router backplane bus. For such routers, the limited bandwidth router backplane bus is essentially replaced with a crossbar switch, thereby producing much higher routing performance. While the same effect can be achieved by tightly integrating the router into the crossbar switch, the invention leverages the substantial investment in existing router hardware and software.

The invention has a number of other advantages. By combining existing routers with existing switches, it is possible to obtain routing performance that scales beyond the current limit of 100,000 packets/second. In addition, the performance scales with the number of links that are added between the router and the switch. If one of several links from the switch to the router fails, the scheme detects this and reassigns traffic to the remaining operational links. The extra links provide both redundancy and extra bandwidth. Moreover, the invention does not rely on any special features of particular implementations, though hardware support for hunt groups can improve efficiency. Thus the invention can be retrofitted into existing routers and bridges, thus preserving customer investment.

Other advantages and features will become apparent from the following description of the preferred embodiment, and from the claims.

BRIEF DESCRIPTION OF THE DRAWING

FIG. 1 is a block diagram of a crossbar switch connected to a router in accordance with the invention;

FIG. 2 is another block diagram of the crossbar switch connected to the router and showing internal structure of each device;

FIG. 3 is a pseudocode representation of the code within a router forwarding engine that implements the turn-around rule.

DESCRIPTION OF THE PREFERRED EMBODIMENTS

Figure 4:
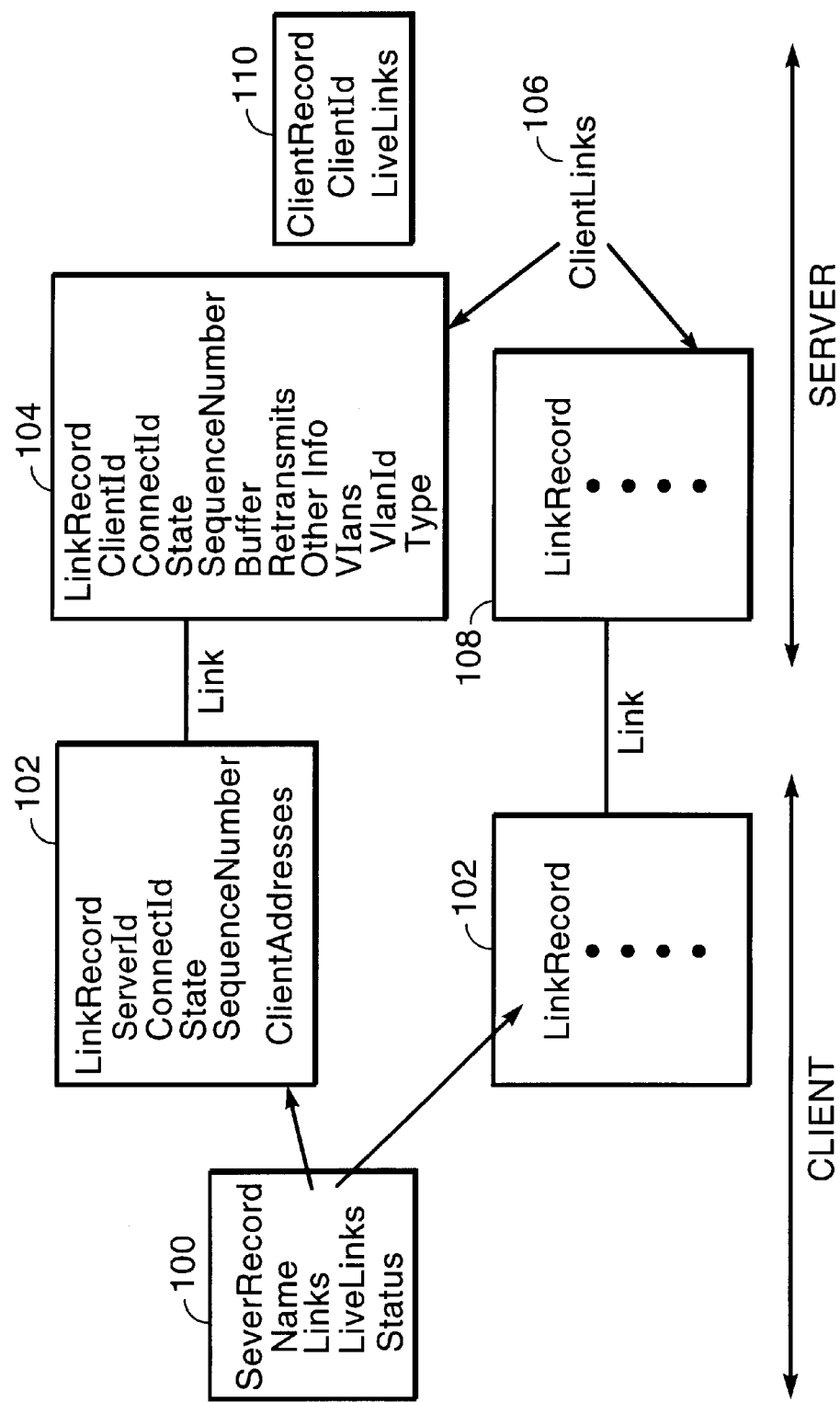
FIG. 4 shows relevant data structures at both the router and the switch.

The basic configuration, shown in FIG. 1, includes a router 10 connected to a crossbar switch (e.g. a bridge) 12 by multiple links 14(1–3) (shown here for illustration purposes only to be limited to three in number). Internal to router 10, there is a backplane bus 15 over which all packets that are transferred from one router port to another pass. Router 10 includes ports to which low speed lines (shown on the left) are connected. Switch 12 includes ports (labelled 1 through 6) to which high speed lines are connected. The low speed lines handle one set of well known network communication protocols such as X.25, T1 and Ethernet. The high speed lines handle another set of well known network protocols such as FDDI, ATM, Sonet, and SMDS. Note that in FIG. 1, all high speed lines are shown to be connected to the right side of switch 12 and all low speed lines are shown to be connected to the left side of router 10. Also note that both the high and low speed lines connected to router 10 and switch 12 will be generally referred to as lines; whereas, the wires connecting switch 12 to router 10 will be generally referred to as links.

Data communications over the network lines occurs through the transmission of packets. A packet typically includes a data link address and a routing address. The routing address identifies the ultimate destination of the packet and the data link address identifies the next hop, i.e., the address of next entity to which the packet will be sent along the path that ultimately leads to its final destination.

Referring to FIG. 2, switch 12 has a separate forwarding engine 21 for each switch port and a forwarding database 17 which enables the forwarding engines to determine through which port different data link destination addresses can be reached. Multiple links 14(1–3) form a hunt group 18 within crossbar switch 12. A hunt group contains multiple instances of a given resource, in this case, the services provided by router 10. Forwarding database 17 identifies the hunt groups that are set up in the bridge and it identifies the ports which belong to those groups. Switch 12 forwards the packets that it receives to router 10 over links 14(1–3) and it employs either a static or a dynamic algorithm to determine how those packets are distributed among the multiple links 14(1–3).

For each port within router 10 there is a forwarding engine 20 that connects the port to the backplane bus 15. Forwarding engine 20 operates in a conventional manner to determine what port a received packet will be sent out on. That is, router 10 includes a forwarding database 22 which identifies through which port any given destination routing address can be reached. Forwarding engine 20 reads the destination address of the received packet and then uses forwarding data base 22 to determine the router port to which the received packet should be transferred over backplane 15. Just as in the case of bridge 12, however, router 10 also identifies which of its router ports belong to the hunt groups that have been established. Before the forwarding engine 20 sends a packet to backplane bus 15, a small additional piece of code 25 within forwarding engine 20 checks forwarding database 22 to determine whether the router port to which the packet will be sent and the router port through which it was received belong to the same group (see FIG. 3). If they do belong to the same group (i.e., the packet is being sent back to the switch from where it came), then forwarding engine 20 simply sends the packet back through the port through which it was received thereby avoiding the slower backplane bus 15. If they do not belong to the same group, forwarding engine 20 sends the packet to the backplane bus for forwarding to the destination port.

Thus, for all packets arriving at router 10 whose destination is other than through switch 12, router 10 performs the normal function of forwarding the packets that it receives to the appropriate destination port over backplane bus 15. Whereas, for all packets arriving at router 10 from switch 12 and addresses for a destination that is reachable through switch 12, router 10 implements the "turn-around" rule shown in FIG. 3. For example, suppose a line 1 packet arrives at router 10 on top link 14(1) and is destined to line 3. Instead of sending the packet out on middle link 14(2) (to which line 3 is assigned), router 10 simply sends the packet back on the same link (i.e., top link 14(1)). Switch 12 then makes the appropriate connections to forward the packet to the destination line and it can do so regardless of which link the packet arrives on. That is, the architecture of the switch is such that traffic to any switch link can be sent out on any of the lines to the switch.

To further explain the operation of the invention, we will examine first the forwarding of packets from switch 12 to router 10 and then the forwarding of packets from router 10 to switch 12.

Forwarding from the Switch to the Router

Consider traffic arriving at switch 12 from the high speed lines on the right of FIG. 1. Of this traffic, consider only traffic destined for router 10. Scalable routing performance from switch 12 to router 10 is achieved by splitting traffic arriving on the high speed lines among the links in the hunt group that connect switch 12 and router 10. There are two general ways the splitting can be done, one way is called dynamic splitting and the other way is called static splitting.

In dynamic splitting, the three links between switch 12 to router 10 are configured into a hunt group. Traffic to router 10 from any of the high speed lines is dynamically split among the links 14(1–3) to router 10 by switch hardware. In accordance with this approach, an internal switch algorithm takes into account the instantaneous load on all the links in the hunt group and sends the next packet to the least loaded link.

In static splitting, the high speed lines are divided more or less evenly among the members of the hunt group. For example, referring again to FIG. 1, high speed lines 1 and 2 are assigned to top link 14(1), high speed lines 3 and 4 are assigned to middle link 14(2), and lines 5 and 6 are assigned to lower link 14(3). Thus, all packets received by switch 12 on lines 1 and 2 and destined to router 10 are forwarded to upper link 14(1). And similarly for the other high speed lines. By contrast, in dynamic splitting, traffic received on lines 1 and 2 and destined to router 10 will be forwarded to whichever link is free, which may be upper link 14(1) at times, and other links at other times. Though dynamic splitting has advantages of performance over static splitting, static splitting is useful for switches which do not have support for dynamic allocation among links of a hunt group.

Forwarding from the Router to the Switch

Now consider traffic sent from router 10 to switch 12. Any packet sent by router 10 to switch 12 can be sent out on any link that connects router 10 to switch 12. Router 10 can split traffic to switch 12 in an arbitrary fashion and the choice of how the splitting is done within router 10 is independent of whether switch 12 is using either static or dynamic splitting.

In the most general form of such splitting, the router high level software is aware of the configuration of switch 12 and makes its forwarding database aware of the three possible paths (i.e. links 14(1–3)) between router 10 and each high speed line that is connected to switch 12. Then, when a packet is to be sent on one of the high speed lines, the forwarding software could choose one of the three paths based on some criterion such as round-robin splitting or choosing the link with the shortest queue. Such an approach, however, would likely require substantial code changes to many levels of the router software. Unlike for switch hunt groups where the splitting is done in hardware, the extra software required in the router may actually slow down the router forwarding process.

Therefore, in the described embodiment, a more restricted form of splitting is used that is substantially simpler to implement and is more efficient. Router 10 statically assigns each of the high speed lines to a corresponding one of physical links 14(1)–14(3). Any traffic from the low speed lines on router 10 (i.e., the lines on the left in FIG. 1) and destined to a high speed line L on switch 12 is sent on the link corresponding to line L. Thus, for example, packet traffic coming in on the Ethernet line of router 10 that is destined to FDDI line 1 on switch 12 is sent on the top link 14(1). Similarly, traffic from the Ethernet line destined to the SMDS line 6 on the switch is sent on the bottom link 14(3).

In other words, in router 10 the traffic from low speed lines to high speed lines is handled using a form of static splitting. Whereas, traffic from a high speed line (e.g. Line 1) and destined to another high speed line (e.g. to Line 3) is handled in accordance with the previously mentioned turn-around rule. To use static assignment and to implement a simple "turn-around" rule at router 10, the higher levels of routing software need not even be aware of this splitting. Only the forwarding code in the router link cards need to be modified to implement the "turn-around rule".

This method is particularly suited to routers, like the DECnis™ router from Digital Equipment Corporation, that have a separate processor in each link card to forward routing traffic. In such routers, the overall forwarding performance is only limited by the speed of the backplane. The above-described technique allows the routing performance of such routers to scale with the number of links to the switch, and yet allows a reasonable implementation.

Dealing with Failures

There is a mechanism for handling failures. Suppose, for example, that bottom link 14(3) in FIG. 1 from switch 12 to router 10 crashes. Then, all the traffic that is being assigned to bottom link 14(3) must be reassigned.

In the case of static splitting between switch 12 and router 10, switch 12 could reassign lines 5 and 6 to belong to top link 14(1) until bottom link 14(3) recovers. In the case of dynamic splitting between switch 12 and router 10, the hunt group between must be reconfigured to remove the lower link.

Similarly, router 10 must split traffic to switch 12 only among the "live links", i.e. the links that are operational. To determine which links are live, switch 12 periodically sends "hellos" on each link to router 10. On receipt of a hello, router 10 sends back a corresponding hello. If switch 12 does not get back a hello from router 10 within a specified time, switch 12 infers that the link has failed and does the necessary reassignment. Similarly, if router 10 does not get a hello from switch 12 within a specified time, router 10 infers that the link has failed and does the necessary reassignment.

Any of a number of approaches can be used to provide this mechanism. As an example of one such approach see U.S. patent application Ser. No. 08/081,622, entitled "VIRTUAL LANS", by George Varghese, John Bassett, Robert E. Thomas, Peter Higginson, Graham Cobb, Barry Spinney, and Robert Simcoe, filed on an even date herewith and incoporated herein by reference.

Router and Switch Data Structures

Relevant data structures at both the router (which will be referred to as the client) and switch 12 (which will be referred to as the server) are shown in FIG. 4. There are ServerRecords 100, one for each switch that is connected to the router, and for each ServerRecord a set of LinkRecords 102, one for each line between the router and the switch. ServerRecords 100 are linked together in a ServerList. And LinkRecords 102 are stored in an array indexed by the link number. Neither the list or the array is explicitly shown in the figure.

Each ServerRecord 100 contains two variables that are set by management. The first is a Name variable that is a local name assigned by management to this server. The second variable is Links, a variable that identifies the set of physical interfaces (i.e., lines) that connect the client to this particular server. In FIG. 2, there are two links between the client and the server shown in the figure; thus, the ServerRecord at the client points to the two corresponding link records. This information identifies the other members of the hunt group.

Two other variables are set by the protocol. First, there is a LiveLinks variable which is the subset of physical links that are operational. The traffic from the client to the server must only be split among the set of LiveLinks. As links fail and recover LiveLinks is updated by the protocol. Finally, there is a State variable which describes error conditions.

Each LinkRecord 102 contains variables required to implement a reliable transport connection with a corresponding link at the server end. Note that if there are multiple links between a client and a server, separate transport connections are set up on each link. A ServerId variable is a 48-bit unique Id of the remote server and the ConnectId is a 32 bit connection identifier. A State variable is the state of the connection; the link is considered to be operational when the connection state is ON.

On the server side there is a variable called ClientLinks 106 that lists the set of server links that are connected to clients. For each such link, the server keeps a LinkRecord 108 corresponding to LinkRecord 102 kept at the client.

The fields ServerId, ConnectId, and State correspond to similar variables in the client LinkRecord 108. Also shown in the server link record are other variables that are not relevant to the invention described herein.

Just as the client keeps a ServerRecord 100 for each server, the server keeps a ClientRecord 110 for each client it knows about. The ClientRecord information is useful in implementing hunt groups at the server. Each ClientRecord stores a ClientId and a variable LiveLinks which represents the set of links to this client that are considered to be operational. If hunt groups are implemented on the server, the links in LiveLinks are configured into a hunt group.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed is:

1. A network interconnection device comprising:

a router having a first plurality of ports, each of said first plurality of ports having a forwarding engine, each said forwarding engine receiving and forwarding packets; and a multiport switch having a second plurality of ports, said second plurality of ports connected to said first plurality of ports by a plurality of links, wherein at least two of said plurality of links defines a group, each link of said group representing a path between said router and said switch over which packets are transferred, wherein each said forwarding engine upon receiving a received packet identifies a receiving port from said second plurality of ports and a destination port from said second plurality of ports for said received packet, wherein each said forwarding engine includes means for determining whether said destination port and said receiving port are connected by links belonging to said group, and means for transmitting the received packet back through said receiving port if said receiving port and said destination port are connected by links belonging to said group.

2. The network interconnection device of claim 1 further comprising a router backplane bus over which packets are transferred from one router port to another router port and wherein said forwarding engine for said given port forwards said received packet to another router port over said backplane bus if either the receiving port and the destination port are connected to links which are not members of a same group.

3. The network interconnection device of claim 1 wherein said determining means comprises a table that identifies all ports connected to links which are members of said group and wherein said determining means uses said table to determine whether the receiving port and the destination port are connected to links which are members of said group.

4. A network interconnection device comprising:

a router having a plurality of router ports;

a multiport switch having a plurality of switch ports with a subset of said switch ports identified as a hunt group, a selected hunt group connecting said multiport switch to said router, and a subset of said router ports connected to said selected hunt group identified as router hunt group ports;

means in said multiport switch for sending a packet to said router, said packet arriving at said router at a receiving port of said router, said receiving port being a member of a router hunt group corresponding to said selected hunt group;

means in said router, responsive to an address in said packet, for determining a router destination port for said packet;

means in said router, responsive to said router destination port, for determining if said router destination port is in said selected hunt group from which said packet was received; and, means in said router, responsive to said destination port being in said selected hunt group, for said router to return said packet to said multiport switch through said receiving port of said router.

\* \* \* \* \*